United States Patent
Holmes

(10) Patent No.: US 9,979,921 B2
(45) Date of Patent: *May 22, 2018

(54) SYSTEMS AND METHODS FOR PROVIDING REAL-TIME COMPOSITE VIDEO FROM MULTIPLE SOURCE DEVICES

(71) Applicant: Russell Holmes, Wetherby (GB)

(72) Inventor: Russell Holmes, Wetherby (GB)

(*) Notice: Subject to any disclaimer, the term of this patent is extended or adjusted under 35 U.S.C. 154(b) by 0 days. days.

This patent is subject to a terminal disclaimer.

(21) Appl. No.: 15/670,720

(22) Filed: Aug. 7, 2017

(65) Prior Publication Data

US 2018/0070045 A1    Mar. 8, 2018

Related U.S. Application Data

(63) Continuation-in-part of application No. 15/360,536, filed on Nov. 23, 2016, now Pat. No. 9,729,820.
(Continued)

(51) Int. Cl.
| | |
|---|---|
| *H04N 7/14* | (2006.01) |
| *H04N 5/445* | (2011.01) |
| *G06K 9/00* | (2006.01) |
| *H04N 7/15* | (2006.01) |
| *G11B 27/031* | (2006.01) |
| *G06T 11/60* | (2006.01) |
| *H04M 11/08* | (2006.01) |
| *H04N 21/218* | (2011.01) |
| *H04N 21/2187* | (2011.01) |
| *H04N 21/234* | (2011.01) |

(52) U.S. Cl.
CPC ..... *H04N 5/44504* (2013.01); *G06K 9/00335* (2013.01); *G06K 9/00362* (2013.01); *G06K 9/00711* (2013.01); *G06T 11/60* (2013.01); *G11B 27/031* (2013.01); *H04M 11/085* (2013.01); *H04N 7/141* (2013.01); *H04N 7/142* (2013.01); *H04N 7/147* (2013.01); *H04N 7/15* (2013.01); *H04N 7/152* (2013.01); *H04N 21/2187* (2013.01); *H04N 21/21805* (2013.01); *H04N 21/23418* (2013.01); *H04N 21/23424* (2013.01); *G06K 9/00275* (2013.01); *G06K 9/00369* (2013.01); *H04N 7/144* (2013.01); *H04N 2007/145* (2013.01)

(58) Field of Classification Search
CPC ....................................................... H04N 7/14
USPC .......... 348/14.01, 14.03, 14.07, 14.15, 14.16
See application file for complete search history.

(56) References Cited

U.S. PATENT DOCUMENTS

| | | |
|---|---|---|
| 7,855,737 B2 | 12/2010 | Petrescu et al. |
| 8,502,856 B2 | 8/2013 | Cranfill et al. |
| (Continued) | | |

OTHER PUBLICATIONS

Office Action for U.S. Appl. No. 15/584,717, dated Jun. 27, 2017, 12 pages.

(Continued)

*Primary Examiner* — Olisa Anwah
(74) *Attorney, Agent, or Firm* — Richards Patent Law P.C.

(57) ABSTRACT

Systems and methods for superimposing the human elements of video generated by computing devices, wherein a first user device and second user device capture and transmit video to a central server which analyzes the video to identify and extract human elements, superimpose these human elements upon one another, and then transmit the newly created superimposed video back to at least one of the user devices.

20 Claims, 13 Drawing Sheets

Related U.S. Application Data

(60) Provisional application No. 62/407,267, filed on Oct. 12, 2016, provisional application No. 62/383,006, filed on Sep. 2, 2016.

(56) References Cited

U.S. PATENT DOCUMENTS

| | | | |
|---|---|---|---|
| 9,729,820 B1 | 8/2017 | Holmes | |
| 2009/0327893 A1* | 12/2009 | Terry | G06F 3/1438 |
| | | | 715/719 |
| 2016/0189425 A1* | 6/2016 | Li | G11B 27/105 |
| | | | 345/633 |
| 2016/0210998 A1* | 7/2016 | Leske | G06T 11/60 |

OTHER PUBLICATIONS

Office Action for U.S. Appl. No. 15/584,717, dated Oct. 13, 2017, 12 pages.
Amendment A for U.S. Appl. No. 15/584,717, filed Aug. 24, 2017, 18 pages.
Amendment B for U.S. Appl. No. 15/584,717, filed Oct. 31, 2017, 7 pages.
Notice of Allowance for U.S. Appl. No. 15/584,717, dated Dec. 5, 2017, 24 pages.
Office Action for U.S. Appl. No. 15/670,682, dated Sep. 22, 2017, 22 pages.
Amendment A for U.S. Appl. No. 15/670,682, filed Aug. 7, 2017, 10 pages.

* cited by examiner

SYSTEMS AND METHODS FOR PROVIDING REAL-TIME COMPOSITE VIDEO FROM MULTIPLE SOURCE DEVICES

BACKGROUND OF THE INVENTION

The present subject matter relates generally to a teleconferencing system. More specifically, the present invention relates to teleconferencing system that simulates the mutual physical presence of users in a virtual interaction.

A teleconference or video interaction over almost any distance is an inherently impersonal experience. Many developments in recent technology have aimed to solve the issue of people missing the aspects of human interactions hearing someone's voice alone does not provide. From teleconferencing, to Facetime and Snapchat, the use of video calling and messages has greatly enhanced communicating over great distances, but these innovations are not without their shortcomings.

Existing video call technology does not allow a user to feel as though they are in close proximity to the person being called. While users may be able to see and speak with a colleague or loved one over Facetime, etc. it is readily apparent both users of such technology are in separate locations.

Accordingly, there is a need for a video communication system that simulates the mutual physical presence of users in virtual interactions.

BRIEF SUMMARY OF THE INVENTION

To meet the needs described above and others, in one embodiment, the subject matter provided herein is embodied in a video call application that provides users the illusion of both being present in a single physical location. Specifically, the embodiment presents the users the visual experience of being able to reach out and touch the person with whom they are speaking. The experience is provided through an application that allows users to make a video call with the additional benefit of being able to superimpose the video from other user(s) devices' cameras onto the video displayed on each of the user devices' screens. This can be used to provide a real-time video image of all callers on the same screen, simulating that everyone involved in the call are physically in each other's presence.

The current invention identifies human elements using the rear and/or front facing camera(s) of a mobile device. The rear facing camera is intended to be used to capture a real-time video feed of human element(s), such as hands, hands and arms or intimate body parts, such as genitalia, etc. The mobile device uses a detection/recognition algorithm to identify these human elements captured in the viewing field of a rear and/or front facing camera(s) of an end user device (e.g. smartphones, tablets, personal computers, etc.).

In one example, a first user may reach behind a mobile device during a video call, whilst still being able to look at the front display screen of their mobile device. The front display screen of their mobile device would show a superimposed real-time video containing a human element, superimposed with real time video from a second user's device. The resulting superimposed video, containing overlapping human elements from each user gives a visual impression of physical interaction between the users.

The application which enables this functionality may be standalone or integrated into other video calling applications. The application may run on mobile devices (e.g., smartphones, tablets, etc.) and personal computers (e.g., desktop computers, laptops, etc.).

Another way in which the application may achieve the superimposed video effect is by use of the multiple cameras of a smartphone or tablet. Most mobile devices have two cameras, one on the front face of the device and one on the back. Some newer devices (e.g., the iPhone 7) include multiple cameras on the back of the device in addition to one or more front facing cameras. In a second example, the application may allow multiple cameras on a user device to be active at the same time, with the system superimposing the human elements (e.g., face, body, hands, etc.) of the video captured by device cameras to give an illusion of physical interaction.

In a third example, the application may utilize a first user's rear facing camera and a second user's front facing camera to enable the first user to physically reach around to the back of the first user device such that the first user's hand (a human element of a video) appears on the second user's screen when the first user's hand is in view of their device's back camera. This arrangement enables the users to both view the video call on their given device's while simultaneously creating a visual representation of physical touching. This effect is achieved by the first user reaching behind their mobile device into the field of view their rear facing camera which is capturing video. The combination of superimposing a live video of a hand (or other human element) taken from a rear facing camera of a mobile device; with a human element (e.g., a face, neck, and torso) from a second users second users live video creates the visual representation of physical interaction/touch between the callers. It should be noted the first user's hand could be superimposed over the face, body, or any other human (or non-human) element(s) captured by the second user's camera. This allows users of the system to carry out the illusion of physical interactions such as shaking hands, high-flying, etc. depending on which device cameras are utilized by end users.

The video from all cameras utilized by system users at a given time may be fed into a central server, which in turn transmits the video(s) to other user(s) involved in a given video call. The transmission and reception of the video calls may be carried out via the internet or any other functionally capable communications network with the superimposition of video carried out by user devices, the central server, or both depending on what is most functionally advantageous.

In all examples/arrangements of the invention a detection/recognition algorithm may be used to identify and extract the human elements from a real-time video feed. One or more of the following detection/recognition methods may be used (in whole or in part) to identify and extract the human element(s) from a live video feed: foreground and background separation, proximity recognition, Chroma keying, hand-arm/body detection, background subtraction, and a Kalman filter. Furthermore, once a human element is captured within the field of vision of an active camera of a user's device, the detection/recognition algorithm will continuously identify and extract the identified human element(s) in real time throughout the duration of the video call. The remainder of the video footage (that has not been identified or extracted as a human element from at least one of the video feeds) may be removed and not shown on the display screen of either user's device.

The application may also allow users to create a user profile which features information about the user, their call preferences, contacts, etc. User profiles may be stored in the memory of the central server, on user devices, or both.

The application may allow for many different video call modes, including: Traditional Video Call—front or rear facing camera only; One Way Touch Call—a superimposed real time video image of one user's front camera and another user's rear camera (or vice versa); Rear Touch Call—a superimposed real time video image of both users' rear cameras (typically used to show holding hands, etc.); and Front Touch Call—a superimposed real time video image of both users' front cameras (typically used to show a kiss, etc.). Movement and the relative position of all visual elements within the frame perimeter of a video call carried out by the system may be tracked by a spatial recognition algorithm. This algorithm may track movement speed, acceleration, and momentum of all visual elements (human elements, background, etc.) in real time.

A goal of the present invention is to increase the quality, intimacy, and entertainment value of video calls. By using the front and rear cameras on a smart phone/tablet, the video superimposing system gives the impression of reaching out and touching another person, playing a game with them, etc. Such interactions are not possible with traditional video chat and could be invaluable to long distance couples, isolated elderly people, overseas business partners, etc.

In one embodiment, a computer-implemented method of superimposing video carried out by a processor, the method includes the steps of: receiving a first live video from a first user device; receiving a second live video from a second user device; identifying a first human element in the first live video and a second human element in the second live video; combining a portion of the first live video and a portion of the second live video in real-time to create a superimposed video including a frame perimeter within which a combined portion of the first live video and second live video is contained, wherein the superimposed video includes the first human element and the second human element, wherein, within the superimposed video, the first human element and the second human element may concurrently occupy any location within the frame perimeter; and transmitting the superimposed video to at least one of the first user device and the second user device.

In some examples, in response to real-time movement by the first human element in the first live video and the second human element in the second live video, contact is simulated between the first human element and the second human element in the superimposed video.

In other examples, in response to real-time movement by the first human element in the first live video and the second human element in the second live video, the first human element is superimposed upon the second human element in the superimposed video such that the first human element obscures at least a portion of the second human element.

In some examples, the first user device is a mobile computing device, in others, it is a personal computer. In some examples, the first live video is captured by a camera of the first user device. In other examples, the first live video is captured by at least two cameras of the first user device simultaneously.

In other examples, the first live video is captured by a rear facing camera of the first user device, the second live video is captured by a front facing camera of the second user device, and the first human element obscures at least a portion of the second human element in the transmitted superimposed video. In still others, the first live video is captured by a rear facing camera of the first user device, the second live video is captured by a rear facing camera of the second user device, and the first human element obscures at least a portion of the second human element in the transmitted superimposed video. Alternatively, the first live video may be captured by a front facing camera of the first user device, the second live video is captured by a front facing camera of the second user device, and the first human element obscures at least a portion of the second human element in the transmitted superimposed video.

Yet another embodiment may feature a computer-implemented system for superimposing video, comprising: a central server featuring a processor, memory, and networking interface; a first user device featuring a camera, processor, memory, and networking interface; a second user device featuring a camera, processor, memory, and networking interface; wherein the central server, receives a first live video from a first user device and a second live video from a second user device, identifies a first human element in the first video and a second human element in the second video, combines a portion of the first video and a portion of the second video in real-time to create a superimposed video including a frame perimeter within which a combined portion of the first video and second video is contained, wherein the superimposed video includes the first human element and the second human element, wherein, within the superimposed video, the first human element and the second human element may concurrently occupy any location within the frame perimeter, and transmits the superimposed video to at least one of the first user device and the second user device.

This system may, in response to real-time movement by the first human element in the first live video and the second human element in the second live video, contact is simulated between the first human element and the second human element in the superimposed video. The system may also, in response to real-time movement by the first human element in the first live video and the second human element in the second live video, the first human element is superimposed upon the second human element in the superimposed video such that the first human element obscures at least a portion of the second human element.

The system may run on a smartphone or desktop computer, wherein the first live video is captured by a rear facing camera of the first user device, the second live video is captured by a front facing camera of the second user device, and the first human element obscures at least a portion of the second human element in the transmitted superimposed video. Alternatively, the first live video may be captured by a rear facing camera of the first user device, the second live video is captured by a rear facing camera of the second user device, and the first human element obscures at least a portion of the second human element in the transmitted superimposed video. Additionally, the first live video may be captured by a front facing camera of the first user device, the second live video is captured by a front facing camera of the second user device, and the first human element obscures at least a portion of the second human element in the transmitted superimposed video.

In some examples of the systems and methods described herein, the superimposed video may simply be the human element of both callers' live video feeds superimposed together. In another example, it may be the human element of one caller's live video feed superimposed over the full live video feed from the second caller. It is contemplated that there is a technical advantage to just overlaying one identified human element, rather than selecting two human elements. For example, just overlaying one identified human element over the full video feed of the other caller requires less computing resources and ideally results in less latency.

Yet another example of the present invention may be described as a computer-implemented method of superimposing video carried out by a processor, the method comprising the steps of receiving a first live video from a first user device; receiving a second live video from a second user device; identifying and extracting, on a continuous basis, a first human element from the first live video using a detection algorithm; combining the first human element and a portion or all of the second live video in real-time to create a superimposed video including a frame perimeter within which the superimposed video includes the first human element and a second human element from the second live video, wherein, within the superimposed video, the first human element and the second human element may concurrently occupy any location within the frame perimeter; and transmitting the superimposed video to at least one of the first user device and the second user device; wherein the first live video is captured by a rear facing camera of the first user device and, in response to movement of the first human element relative to the first user device, the first human element obscures at least a portion of the second human element in the transmitted superimposed video.

The method above may also, in response to real-time movement by the first human element relative to the first user device and the second human element relative to the second user device, simulate contact between the first human element and the second human element in the superimposed video.

The first user device mentioned as part of this method may be a mobile computing device and/or a personal computer. The first live video may be captured by at least two cameras of the first user device simultaneously and the second live video is captured by a front facing camera of the second user device. The second live video may also be captured by a rear facing camera of the second user device.

The detection algorithm mentioned as part of this method may utilize one of more of the following: foreground and background separation, proximity recognition, Chroma keying, hand-arm/body detection, background subtraction, and a Kalman filter. The detection algorithm utilized may be automatically selected to optimize processor utilization and/or performance and also selected to optimize image quality of the superimposed video generated. It should be noted the method discussed in this example can also be embodied by a system which features the same components and completes the same tasks. For example, a computer-implemented system for superimposing video, may include: a central server featuring a processor, memory, and networking interface; a first user device featuring a camera, processor, memory, and networking interface; a second user device featuring a camera, processor, memory, and networking interface; wherein one of the central server, the first user device's processor, and the second user device's processor: receives a first live video from a first user device and a second live video from a second user device; identifies and extracts, on a continuous basis, a first human element from the first live video using a detection algorithm; combines the first human element with a portion or all of the second live video in real-time to create a superimposed video including a frame perimeter within which the superimposed video includes the first human element and a second human element from the second live video, wherein, within the superimposed video, the first human element and the second human element may concurrently occupy any location within the frame perimeter; and transmits the superimposed video to at least one of the first user device and the second user device; wherein the first live video is captured by a rear facing camera of the first user device and, in response to movement of the first human element relative to the first user device, the first human element obscures at least a portion of the second human element in the transmitted superimposed video.

An advantage of the present invention is that the application gives another dimension to traditional video calls and allows friends and families that are apart from each other to not only experience the sensation of being able to touch their loved ones from anywhere with an internet connection. The present invention could allow someone climbing Mt. Everest to call someone in the depths of the Amazon rainforest and both parties could simulate being beside one another.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
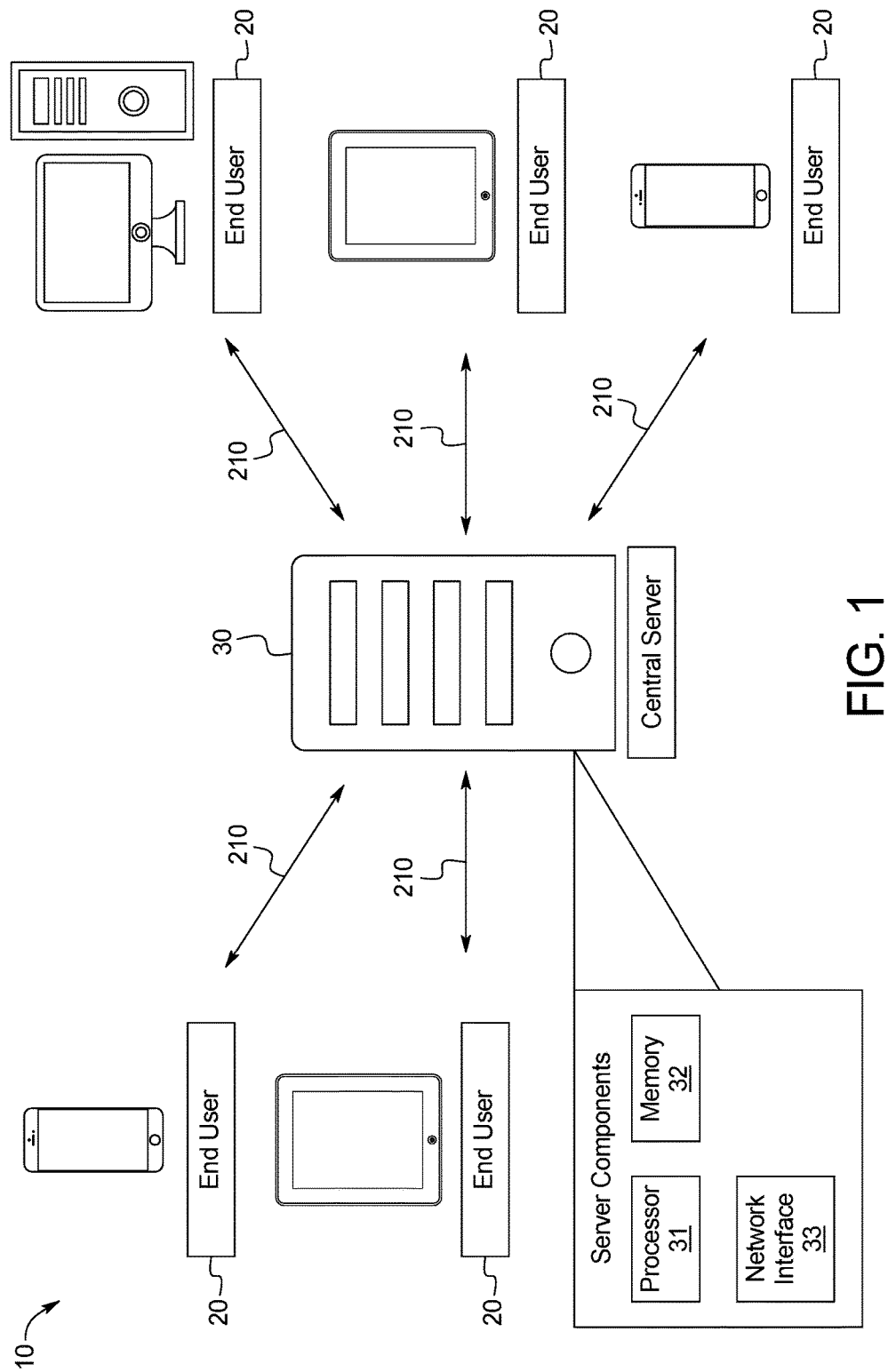
FIG. 1 is a schematic diagram of a multi-feed video call system.
Figure 2:
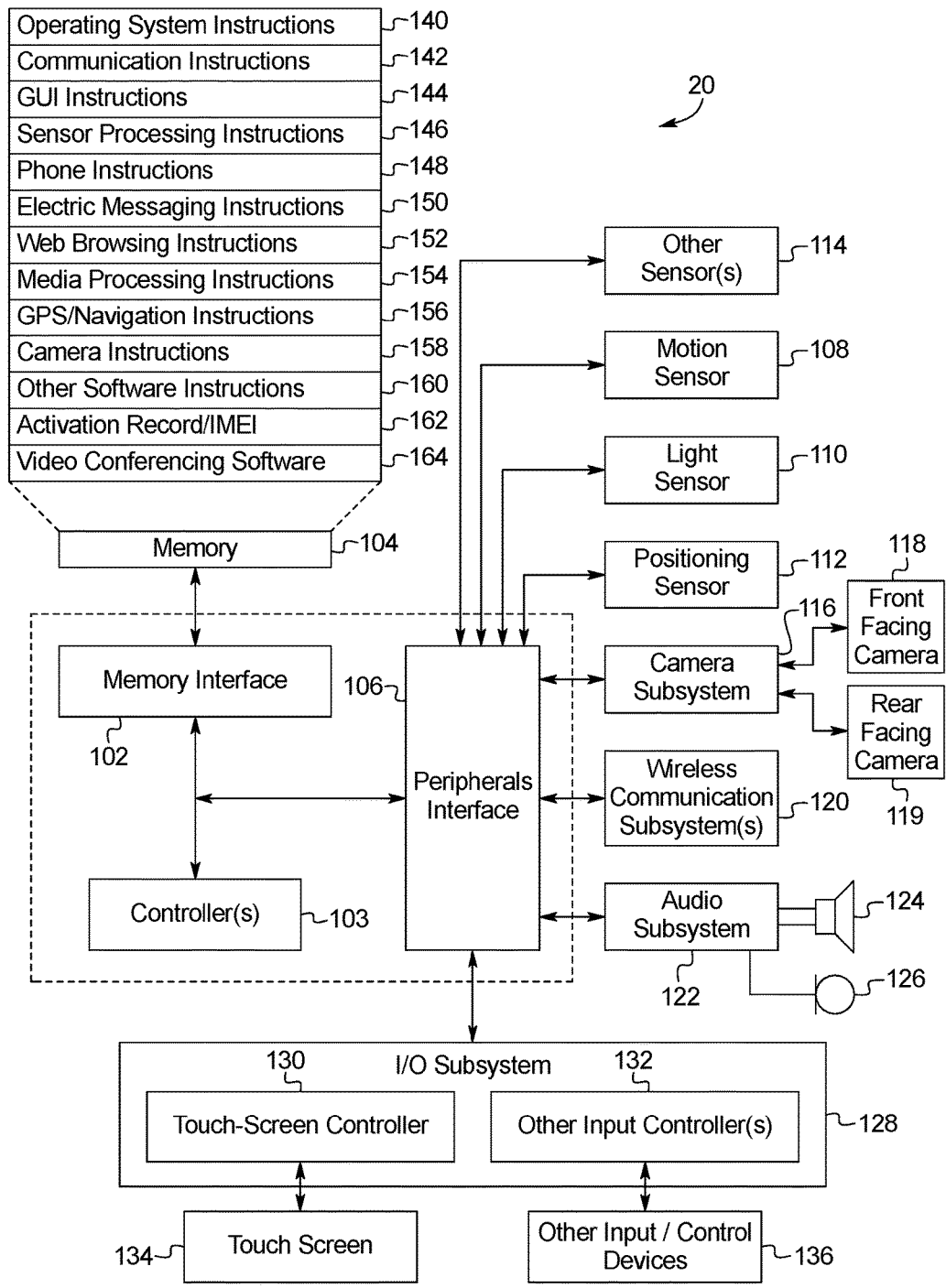
FIG. 2 is a schematic diagram illustrating an example of an end user device that may be used in the system shown in FIG. 1.

FIG. 1 is a schematic diagram of a multi-feed video call system 10. As shown in FIG. 1, the system 10 features multiple end users' devices 20. Each end user device 20 (e.g., a laptop computer, smartphone, tablet, etc.) sends video 210 to a central server 30 from an end user device camera subsystem 116 through its wireless communication subsystem(s) 120 and receives video 210 from the central server 30 to be displayed and output through the end user device I/O subsystem 128 and the end user device audio subsystem 124. As shown in FIG. 2, a camera subsystem 116 may, for example, include front 118 and back 119 cameras of a smartphone.

Figure 4:
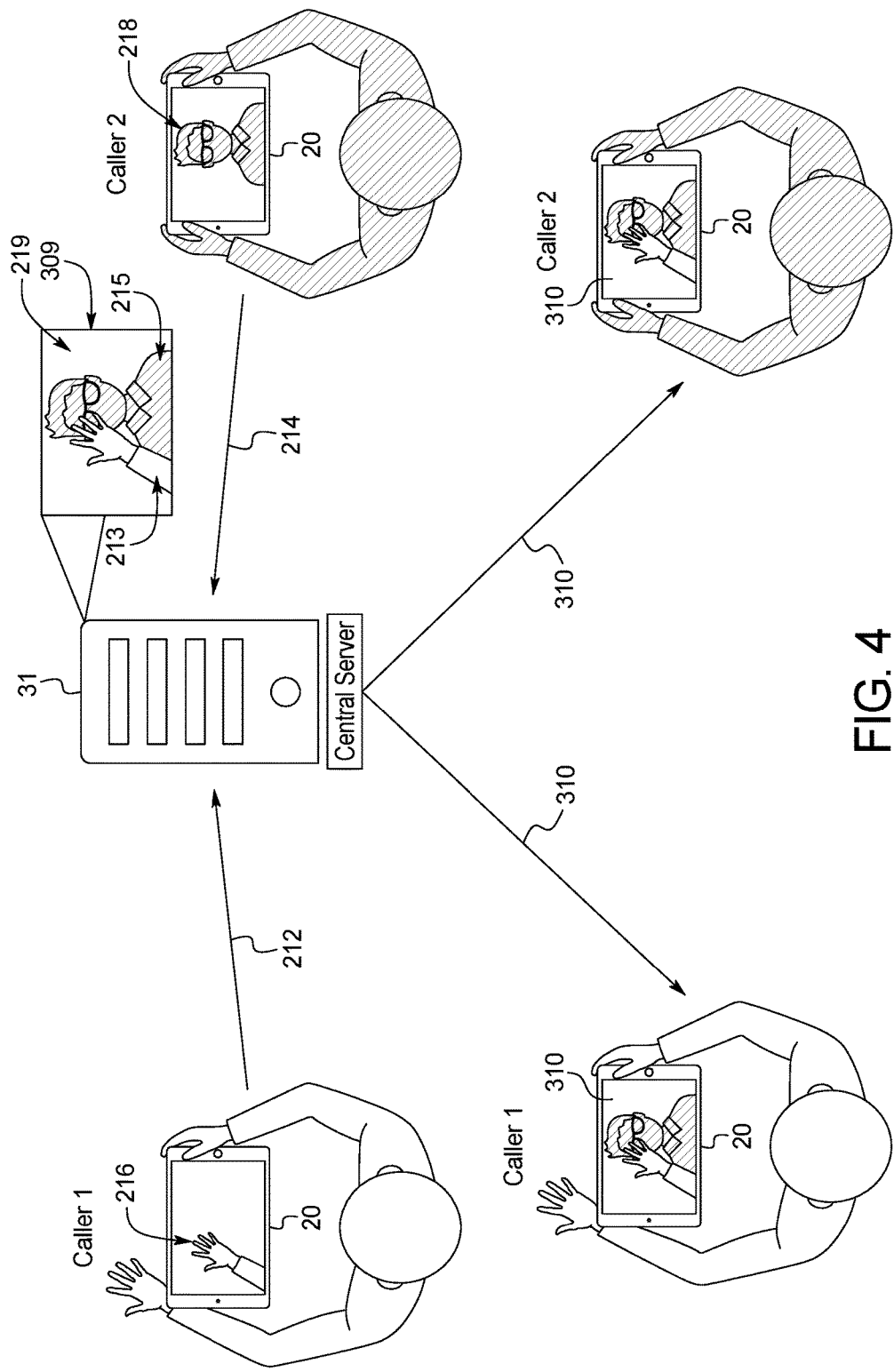
FIG. 4 illustrates the multi-feed video call system superimposing videos.

As described further herein, a primary object of the system 10 is to enable a portion of a first live video 212 to be superimposed upon a second live video 214 (illustrated in FIG. 4) to produce a superimposed video 310 (illustrated in FIG. 4) in which human elements (e.g., a first human element 216 and second human element 218—also seen in FIG. 4) from each of the first live video 212 and the second live video 214 may interact and be displayed in any position relative to each other to simulate the appearance of the human elements from each of the first live video 212 and the second live video 214 to be present in the same physical space.

As shown in FIG. 1, the central server 30 includes a processor 31 and memory 32 for carrying out the superimposition of video 210 (e.g., combining portions of a first live video 212 and a second live video 214 into the superimposed video 310), as well as a networking interface 33 for communication with user devices 20, as described further herein. The superimposed video 310 (shown in FIG. 4) created by the server 30 is then transmitted back to the user devices 20. The superimposed video 310 simulates users being physically in each other's presence.

It should be noted that in the example described above, the analysis, processing, and transformation of video 210 is carried out on the central server 30. In alternative embodiments, some, or all, of such actions may be carried out on one or more of the end user devices 20.

FIG. 2 is a schematic diagram illustrating an example of an end user device 20 that may be used in the system shown in FIG. 1. In the example shown in FIG. 2, the multi-feed video call system 10 runs as a video conferencing application embodied in video conferencing software 164 on the end user device 20. As shown in FIG. 2, the end user device 20 maybe a mobile device, such as a smartphone, running video conferencing software 164 to provide the functionality described herein. A user may install the video conferencing software 164 on his or her end user device 20 via Apple's App Store, the Android Market, etc. The end user device 20 may include a wireless communication subsystem 120 to communicate with the central server 30 running the video conferencing software 164.

The user device 20 may include a memory interface 102, controllers 103, such as one or more data processors, image processors and/or central processors, and a peripherals interface 106. The memory interface 102, the one or more controllers 103 and/or the peripherals interface 106 can be separate components or can be integrated in one or more integrated circuits. The various components in the user device 20 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 163, and positioning sensors 112 (e.g., GPS receiver, accelerometer) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 includes a physical camera (e.g., a charged coupled device (CCD) or a complementary metal-oxide semiconductor (CMOS) optical sensor) which can be utilized to facilitate camera functions, such as recording photographs and video clips. Modern smartphones and other devices typically feature more than one physical camera operated by the camera subsystem 116. Such cameras may be located on the front of the device 20—the side of the device with a screen (e.g., front cameras 118) or rear of the device 20—the side opposite the screen (e.g., rear facing cameras 119).

Communication functions can be facilitated through a network interface, such as one or more wireless communication subsystems 120, which can include radio frequency receivers and transmitters and/or optical (e.g., infrared) receivers and transmitters. The specific design and implementation of the communication subsystem 120 can depend on the communication network(s) over which the user device 20 is intended to operate. For example, the user device 20 can include communication subsystems 120 designed to operate over a GSM network, a GPRS network, an EDGE network, a Wi-Fi or Imax network, and a Bluetooth network. In particular, the wireless communication subsystems 120 may include hosting protocols such that the user device 20 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 may include a touch screen controller 130 and/or other input controller(s) 132. The touch-screen controller 130 can be coupled to a touch screen 134, such as a touch screen. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 may be coupled to memory 104. The memory 104 can include high-speed random access memory and/or non-volatile memory, such as one or more magnetic disk storage devices, one or more optical storage devices, and/or flash memory (e.g., NAND, NOR). The memory 104 may store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 104 may also store communication instructions 142 to facilitate communicating with one or more additional devices, one or more computers and/or one or more servers. The memory 104 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 104 may also store other software instructions controlling other processes and functions of the user device 20 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 104. As described above, the video conferencing software 164 is also stored in the memory 104 and run by the controllers 103.

Each of the above identified instructions and applications can correspond to a set of instructions for performing one or more functions described herein. These instructions need not be implemented as separate software programs, procedures, or modules. The memory 104 can include additional instructions or fewer instructions. Furthermore, various functions of the user device 20 may be implemented in hardware and/or in software, including in one or more signal processing and/or application specific integrated circuits. Accordingly, the user device 20, as shown in FIG. 2, may be adapted to perform any combination of the functionality described herein.

Aspects of the systems and methods described herein are controlled by one or more controllers 103. The one or more controllers 103 may be adapted run a variety of application programs, access and store data, including accessing and storing data in associated databases, and enable one or more interactions via the user device 20. Typically, the one or more controllers 103 are implemented by one or more programmable data processing devices. The hardware elements, operating systems, and programming languages of such devices are conventional in nature, and it is presumed that those skilled in the art are adequately familiar therewith.

For example, the one or more controllers 103 may be a PC based implementation of a central control processing system utilizing a central processing unit (CPU), memories and an interconnect bus. The CPU may contain a single microprocessor, or it may contain a plurality of microcontrollers 103 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory is non-transitory and stores at least portions of instructions for execution by the CPU and data for processing in accord with the executed instructions.

The one or more controllers 103 may further include appropriate input/output ports for interconnection with one or more output displays (e.g., monitors, printers, touchscreen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 103 may include a graphics subsystem to drive the output display. The links of the peripherals to the system may be wired connections or use wireless communications.

Although summarized above as a smartphone-type implementation, those skilled in the art will recognize that the one or more controllers 103 also encompasses systems such as host computers, servers, workstations, network terminals, PCs, and the like. Further one or more controllers 103 may be embodied in a user device 20, such as a mobile electronic device, like a smartphone or tablet computer. In fact, the use of the term controller is intended to represent a broad category of components that are well known in the art.

Figure 3:
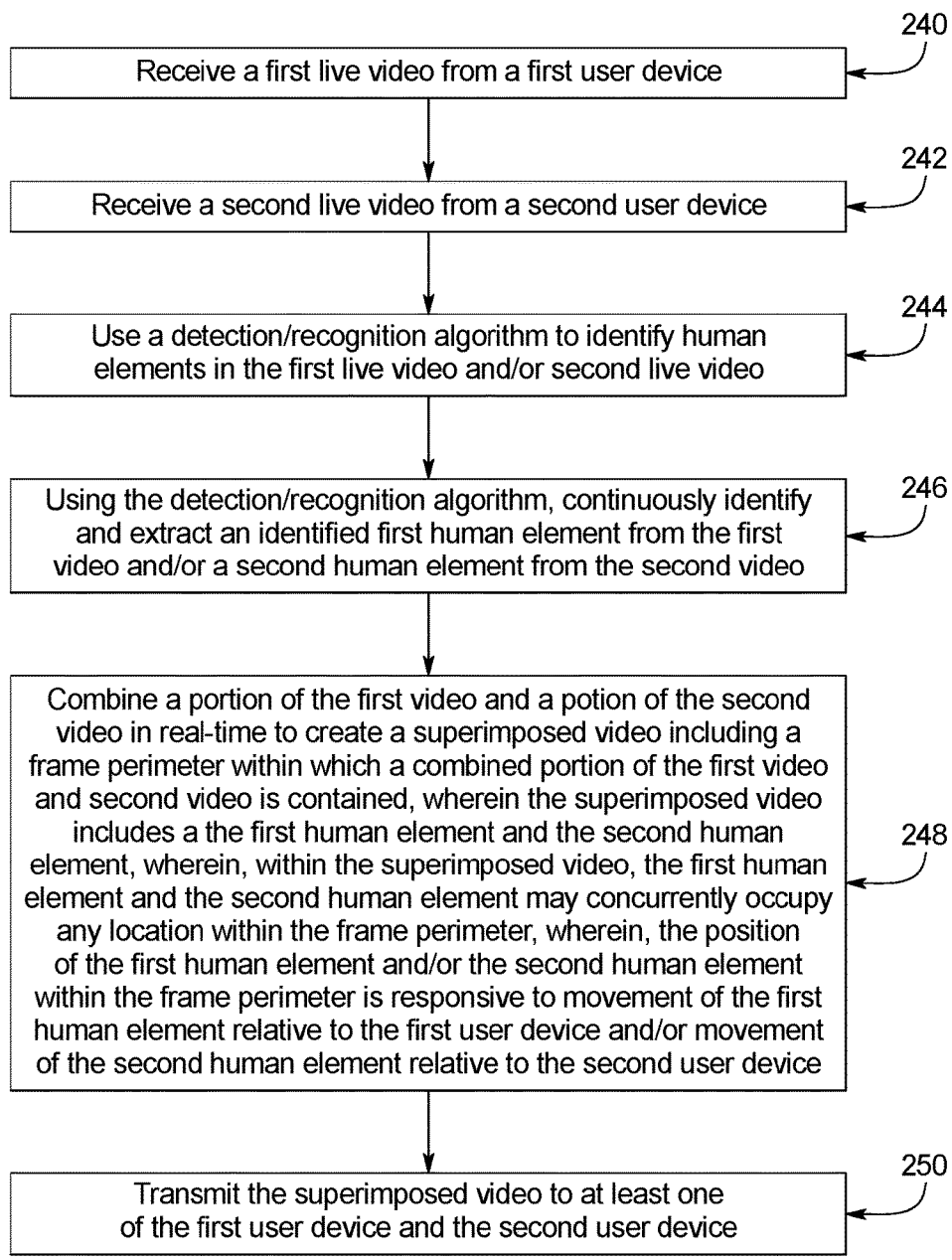
FIG. 3 is a flowchart illustrating a computer-implemented method of superimposing video carried out by a processor.

FIG. 3 is a flowchart illustrating a computer-implemented method of superimposing video 210 carried out by a processor 31. As shown in FIG. 3, the method of superimposing video 210 carried out by a processor 31 begins with the processor 31, at a first step 240 receiving a first live video 212 from a first user's device 20. Reception 240 by a processor 31 is illustrated in FIG. 4, wherein the user device 20 of a first user transmits a first live video 212 (in this case a video 210 captured by the user's rear camera 119) to a processor 31 containing central server 30. The second step 242 of superimposing video 210 carried out by a processor 31 is receiving a second live video 214 from a second user's device 20. Again referring to FIG. 4, reception of the second live video 214 from a second user's device 20 by a processor 31 is illustrated (with the second live video 214 being captured by the second user's front camera 118). The third step 244 of this method calls for the processor 31 to identify a first human element 216 in the first video 212 and/or a second human element 218 in a second video 214 by use of a detection/recognition algorithm. Such human elements 216, 218 are illustrated in FIG. 4 with the first human element 216 being a hand (captured by the first user's rear camera 119) and the second human element 218 being a face (captured by the second user's front camera 118).

The fourth step 246 calls for the system 10 to continuously identify and extract a first human element 216 (identified in the first video 212) and/or second human element 218 (identified in the second video 214) from their respective videos via use of the detection/recognition algorithm. Extraction may be carried out by the detection/recognition algorithm or a separate piece of programming and the methodologies used to extract a given human element may vary depending on technological resources available to a given set of end users. For example, if the system 10 was utilized by users with slower computing components, the extraction methodology used (e.g., foreground and background separation, proximity recognition, Chroma keying, hand-arm/body detection, background subtraction, and/or a Kalman filter) may be automatically selected by the system to utilize as little processor 31 power as possible.

The fifth step 248 of the computer-implemented method of superimposing video 210 carried out by a processor 31 is combing a portion of the first video 213 and a portion of the second video 215 in real-time to create a superimposed video 310 including a frame perimeter 309 within which a combined portion of the first video 212 and second video 214 is contained, wherein the superimposed video 310 includes the extracted first human element 216 and the second human element 218, wherein, within the superimposed video 310, the first human element 216 and the second human element 218 may concurrently occupy any location within the frame perimeter 309 and the positions of the human elements 216 and/or 218 within the frame perimeter 309 are responsive to movement of these human elements 216 and/or 218 relative to their corresponding end user devices 20. It should be noted that the system may unilaterally extract a human element from one video (e.g., the first human element 216 or second human element 218, in this example) without a human element being present in both videos 212 and 214.

A key feature of the multi-feed video call system 10 is that, within the superimposed video 310, the first human element 216 and the second human element 218, are each able to occupy any portion of the superimposed video 310. In the example shown in FIG. 4, this feature is represented by the ability of either the first human element 216 or the second human element 218 to occupy any space within the frame perimeter 309 and the frame perimeter 309 is shown to occupy the entirety of the display on the device 20. While this is one contemplated example, it is understood that the frame perimeter 309 for the superimposed video 310 may otherwise occupy a smaller portion of the display on the device 20. The critical concept relating to the ability of either the first human element 216 or the second human element 218 to occupy any space within the frame perimeter 309 is that the first human element 216 and the second human element 218 may occupy adjacent positions on the screen, may separate from each other, and may pass in front of or behind each other, or any be represented by any combination of these relative positions. For example, some portion of the first human element 216 may be shown to be touching the second human element 218 while other portions of the first human element 216 may be shown to be separated from the second human element 218.

The portion of the first video 213 and a portion of the second video 215 combined in real-time may be only the extracted first human element 216 and second human element 218, or can include more video 210 from the live videos 212, 213. This additional video 210, beyond the human elements 216, 218 may include a background 219. Such a background 219 is illustrated in FIG. 4 (in this case a plain solid color), with the human elements 216, 218 able to occupy any space within the frame perimeter 309 and move independently of each other and the background 219. The background 219 can be generated by the system 10 of captured by a device 20 camera 118, 119 and extracted from either of the live videos 212,213. In the example shown in FIG. 4, the first human element 216 (a hand) is superimposed on top of the second human element 218 (a face) with both elements 216, 218 being able to occupy the same location at the same time. In this example, since the first human element 216 is superimposed by the processor 31 over the second human element 218, the hand is able to obscure the face in the superimposed video 310. The frame perimeter 309, also illustrated in FIG. 4, is the defined size of the superimposed video 310 (e.g., the aspect ratio, etc.) which may be automatically determined by the processor 31 based off the videos 210 provided to it.

The final step 250 of the computer-implemented method of superimposing video 210 carried out by a processor 31 is transmitting the superimposed video 310 to a user device 20. Such transmission is shown in FIG. 4, in which the superimposed video 310 is displayed on the first user and second user's devices 20. Worth noting here is that the example shown in FIG. 4 utilizes one user device's 20 front camera 118 and one user device's 20 back camera 119, but the present invention may also utilize multiple cameras of a device 20 facing the same direction to capture video 210 concurrently. One such device 20 with multiple cameras facing the same direction is the iPhone 7, which is capable of blending or stitching images captured by is multiple cameras together to provide wide angle images, greater image quality, etc. Such functionality may be utilized by the current invention to improve the quality of video calls carried out upon it.

Additionally, FIG. 4 demonstrates two human elements 216, 218 which may occupy the same location within a frame perimeter 309 at the same time. This results in one of the human elements 216 being able to obscure the other 218. The present system 10 may also be configured in a manner which prevents the identified and extracted human elements 216, 218 from obscuring one another. In practical terms, the human elements 216, 218 would be treated as "solid" instead of one element 216 being able to pass over and obscure another 218, with the background 219, frame perimeter 309, etc. being automatically adjusted by the system 10 to prevent such overlap. The movement and relative position of all human elements may be tracked by a spatial recognition algorithm. This algorithm may track the speed and acceleration of each element present within the frame perimeter 309 of a given video call in real time.

Figure 5A:
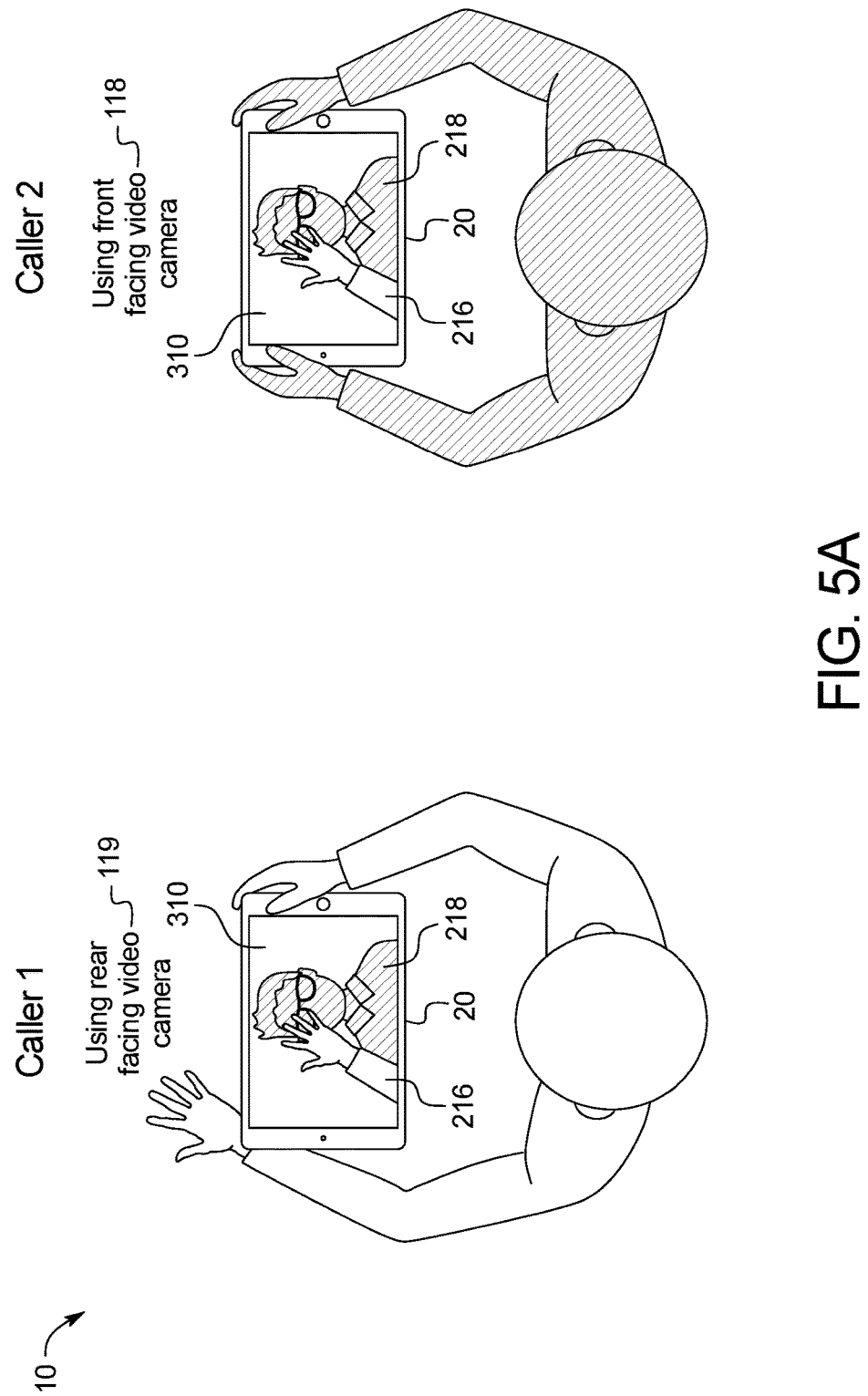
FIG. 5A illustrates a One Way Touch call using the multi-feed video call system.

FIG. 5A is an overview diagram of a One Way Touch call using the multi-feed video call system 10. As shown in FIG. 5A, a superimposed real-time video 310 of one user's front camera 118 (Caller 2) and another user's rear camera 119 (Caller 1) is displayed to both users. In this example, the video 210 from Caller 2's device's front camera 118 is shown on both Caller 1 and Caller 2's device 20 screens, with the video 210 from Caller 1's device's back camera 119 superimposed over Caller 2's front camera 118 video 210 allowing Caller 1 to "touch" (i.e., see their hand or other human element(s) superimposed upon the face and/or body of another user) Caller 2 via an illusion created by the superimposition of the video 210. In this example, the first human element 216 is associated with Caller 1's hand and the second human element 218 is associated with Caller 2's face, neck, and upper torso. It should be noted however the labels regarding the first human element 216 and second human element 218 could be reversed in this example (and the examples seen in FIGS. 6A, 7A, and 8A) as which human element is labeled first and second does not automatically dictate which element will be superimposed over the other.

Figure 5B:
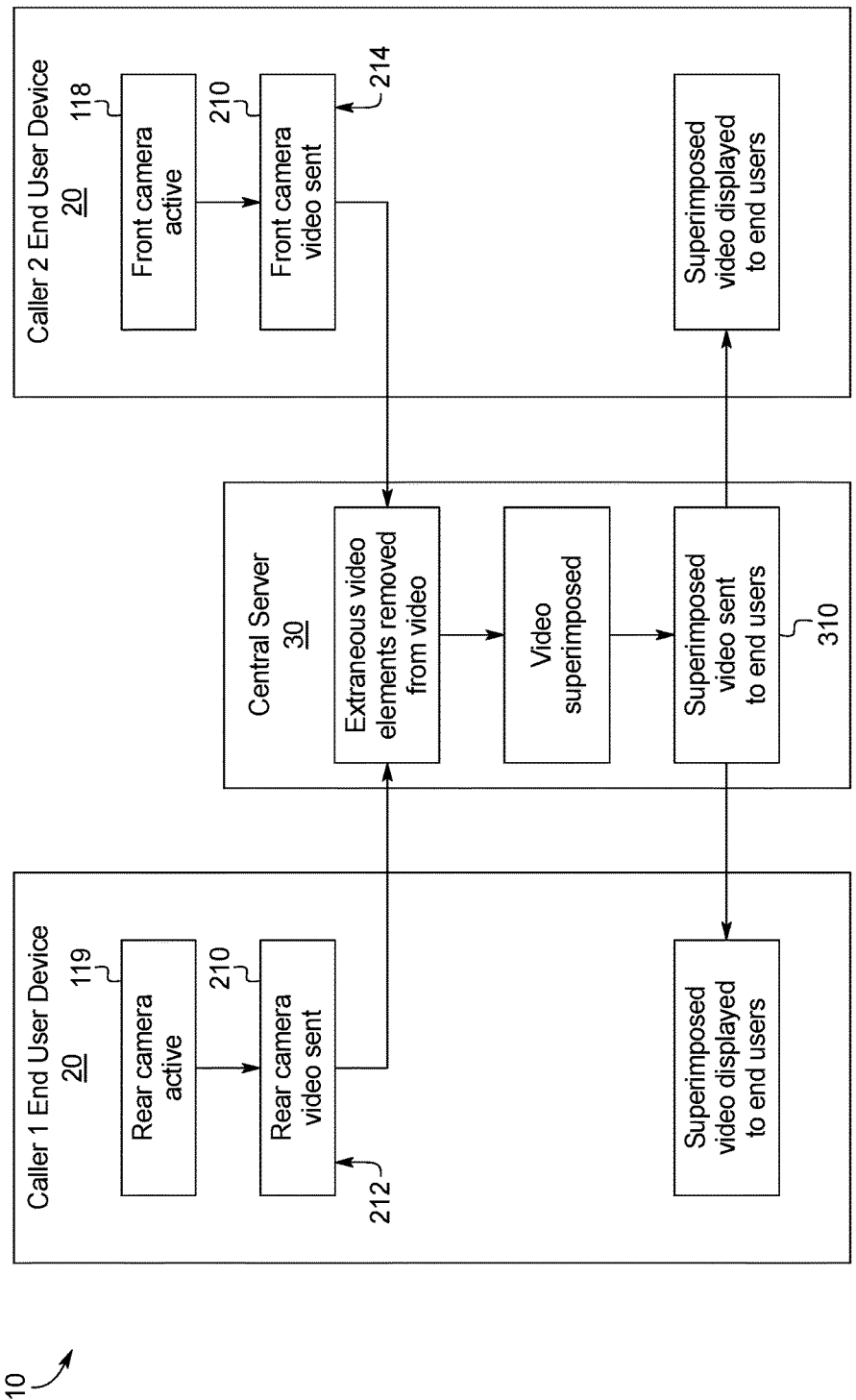
FIG. 5B is a hybrid schematic-flowchart showing how the components of the multi-feed video call system may cooperate to accomplish a One Way Touch call using the process shown in FIG. 3.

FIG. 5B is a flowchart of a One Way Touch call using the multi-feed video call system 10. As shown in FIG. 5B, the video 210 which will be superimposed by the system 10 originate on respective caller's end user devices 20. One user's (Caller 1's) rear camera 119 and another user's (Caller 2's) front camera 118 send video 210 to a centralized sever 30. In this embodiment, as well as the embodiments illustrated in FIGS. 3C, 4B, 5B, and 6B, the system 10 may automatically determine which user's video 210 is superimposed over the other (e.g., which human element (hand, face, torso, etc.) is superimposed over the other human element(s) displayed in the superimposed video 310). In other embodiments, the determination of which human element(s) of video 210 are superimposed upon one another may also be manually set by the participants of a given video call or the system 10 may be set to not superimpose human elements. The video 210 may be sent via the internet or any other functionally useful means, with the central server 30 receiving the separate video 210, analyzing them, removing extraneous information from the video 210 (e.g., solid colored backgrounds, etc.), and combining the two respective video 210 into one superimposed video 310. The superimposed video 310 is then sent back to the user device's 20 involved in the video chat via the internet or any other functionally useful means.

In this example, the first live video 212 is associated with Caller 1's and the second live video 214 is associated with Caller 2. It should be noted however the labels regarding the live videos 212, 214 could be reversed in this example (and the examples seen in FIGS. 6B, 7B, and 8B) as which video 212, 214 is labeled first and second does not automatically dictate which will be superimposed over the other.

Figure 5C:
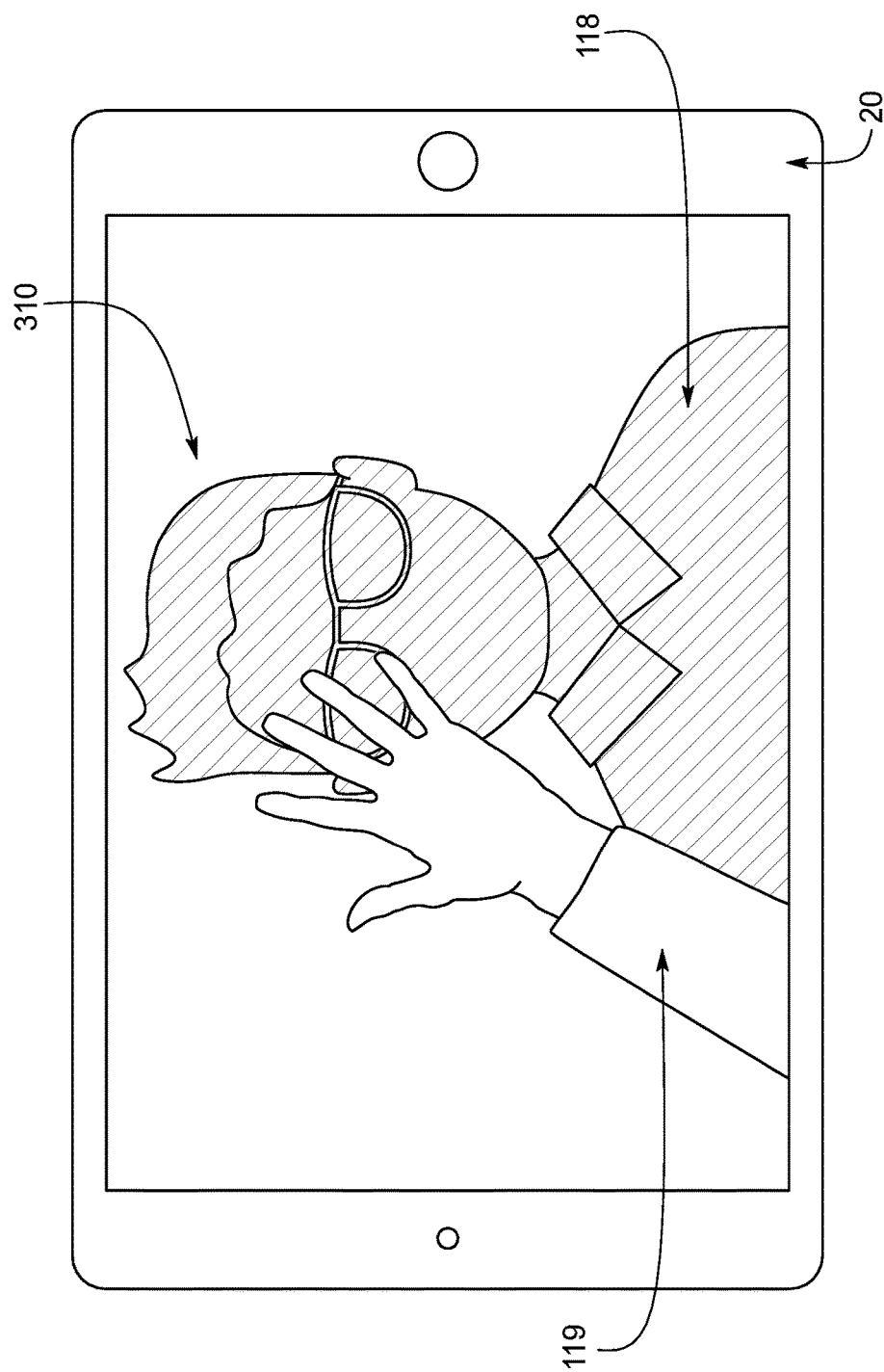
FIG. 5C illustrates a user device displaying a superimposed video in a One Way Touch call.

FIG. 5C is a diagram of a user device 20 displaying a One Way Touch call. As shown in FIG. 5C, an end user device 20 may display a super imposed video 310 which features, in this example, the video 210 from Caller 2's (as shown in FIG. 3A) device's front camera 118 with the video 210 from Caller 1's (as shown in FIG. 3A) device's back camera 119 superimposed over Caller 2's front camera 118 video 210 allowing Caller 1 to "touch" (i.e., see their hand or other human element(s) superimposed upon the face and/or body of another user) Caller 2 via an illusion shown within the superimposed video 310.

Figure 6A:
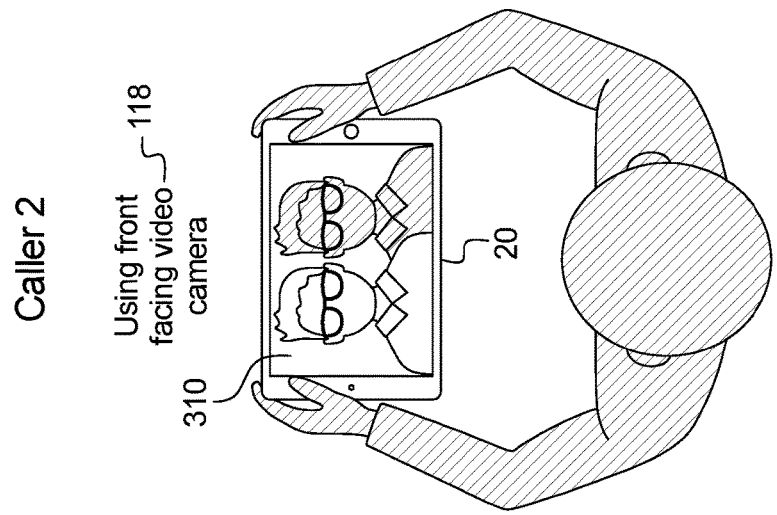
FIG. 6A illustrates a Front Touch call using the multi-feed video call system.
Figure 6A:
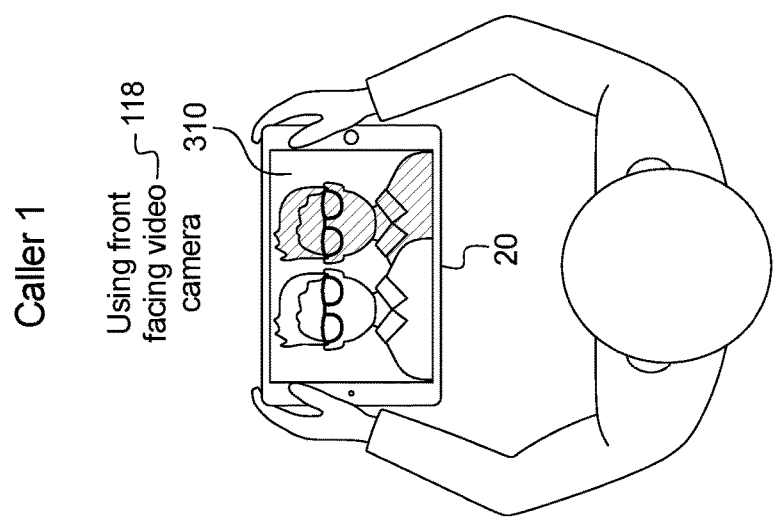

FIG. 6A is an overview diagram of a Front Touch call using the multi-feed video call system 10. As shown in FIG. 6A, a superimposed real time video 310 of both users' front camera 118 (Caller 1 and Caller 2) is displayed to both users. In this example, the video 210 from Caller 1's device's front camera 118 is shown on both Caller 1 and Caller 2's device 20 screens, with the video 210 from Caller 2's device's front camera 118 superimposed over Caller 2's front camera 118 video 210, allowing the users to appear to be physically side by side.

Figure 6B:
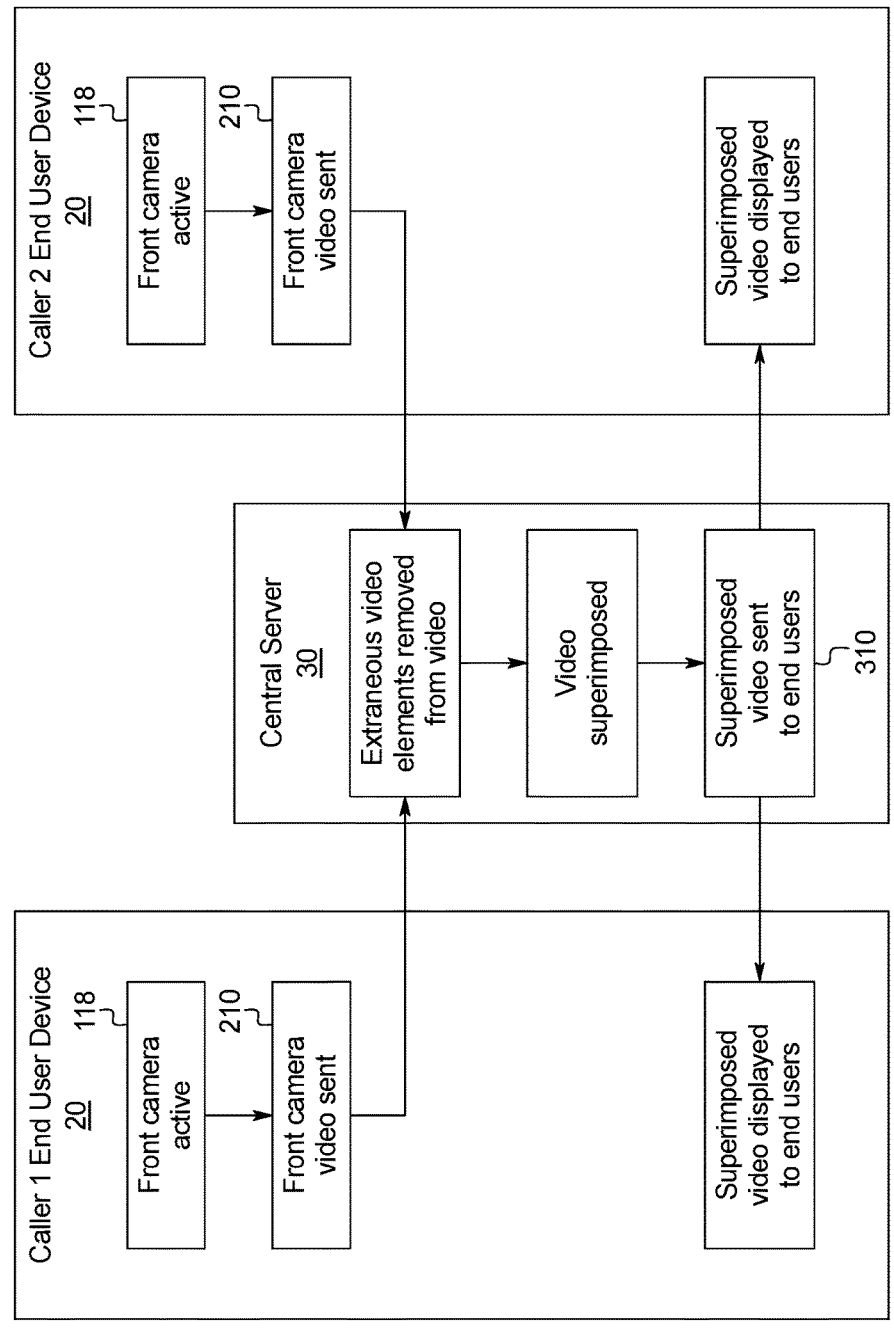
FIG. 6B is a hybrid schematic-flowchart showing how the components of the multi-feed video call system may cooperate to accomplish a Front Touch call using the process shown in FIG. 3.

FIG. 6B is a flowchart of a Front Touch call using the multi-feed video call system 10. As shown in FIG. 6B, the video 210 which will be superimposed by the system 10 originate on respective caller's end user devices 20. Both users' (Caller 1 and Caller 2) front camera 118 send video 210 to a centralized server 30. The video 210 may be sent via the internet or any other functionally useful means, with the central server 30 receiving the separate video 210, analyzing them, removing extraneous information from the video 210 (e.g., solid colored backgrounds, etc.), and combining the two respective video 210 into one superimposed video 310. The superimposed video 310 is then sent back to the user device's 20 involved in the video chat via the internet or any other functionally useful means.

Figure 7A:
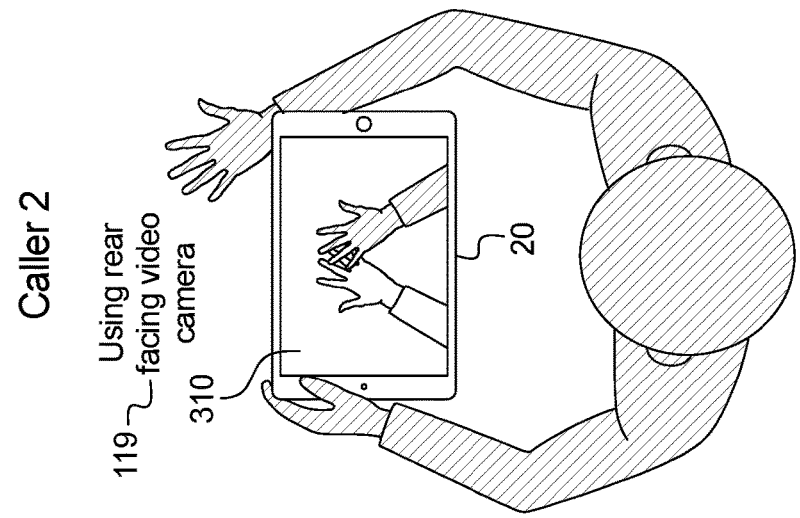
FIG. 7A is an overview diagram of a Rear Touch call using the multi-feed video call system.
Figure 7A:
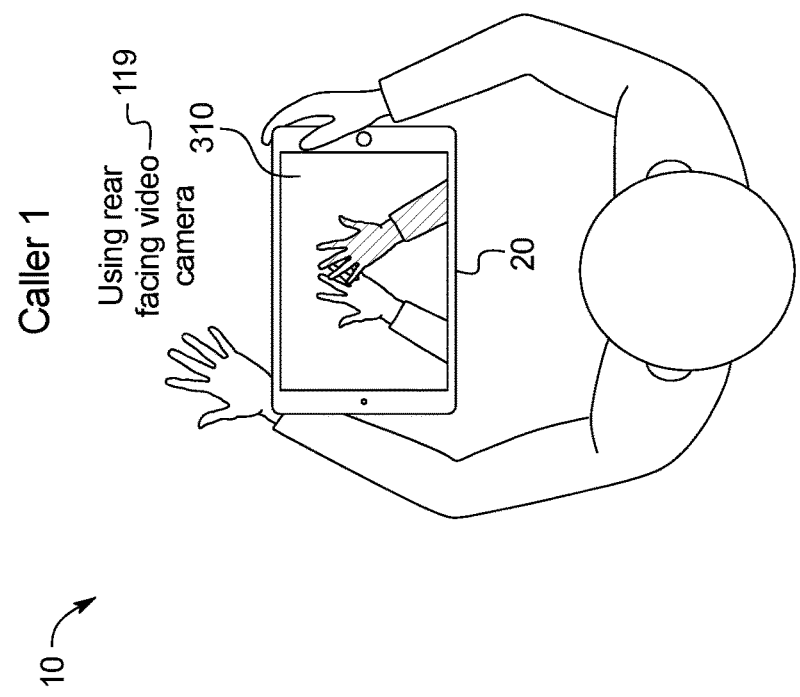

FIG. 7A is an overview diagram of a Rear Touch call using the multi-feed video call system 10. As shown in FIG. 7A, a superimposed real-time video 310 of both users' rear cameras 119 (Caller 1 and Caller 2) is displayed to both users. In this example, the video 210 from Caller 1's device's rear camera is shown on both Caller 1 and Caller 2's device 20 screens, with the video 210 from Caller 2's device's rear camera 119 superimposed over Caller 1's rear camera video 210, forming the superimposed video 310, and allowing the users to appear to be physically holding hands, etc.

Figure 7B:
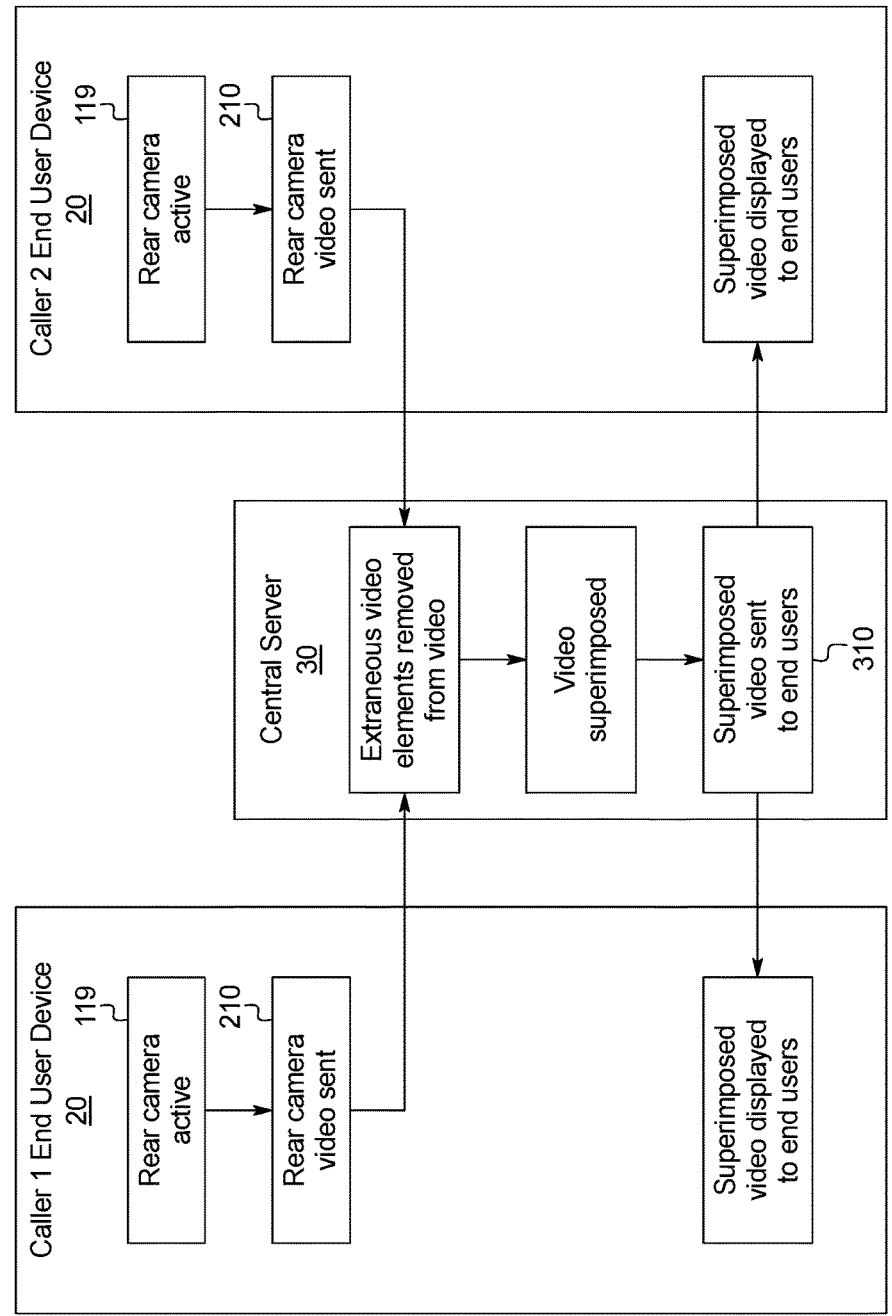
FIG. 7B is a hybrid schematic-flowchart showing how the components of the multi-feed video call system may cooperate to accomplish a Rear Touch call using the process shown in FIG. 3.

FIG. 7B is a flowchart of a Rear Touch call using the multi-feed video call system 10. As shown in FIG. 7B, the video 210 which will be superimposed by the system 10 originate on respective caller's end user devices 20. Both users' (Caller 1 and Caller 2) rear camera 119 send video 210 to a centralized server 30. The video 210 may be sent via the internet or any other functionally useful means, with the central server 30 receiving the separate video 210, analyzing them, removing extraneous information from the videos 210 (e.g., solid colored backgrounds, etc.), and combining the two respective video 210 into one superimposed video 310. The superimposed video 310 is then sent back to the user device's 20 involved in the video chat via the internet or any other functionally useful means.

Figure 8A:
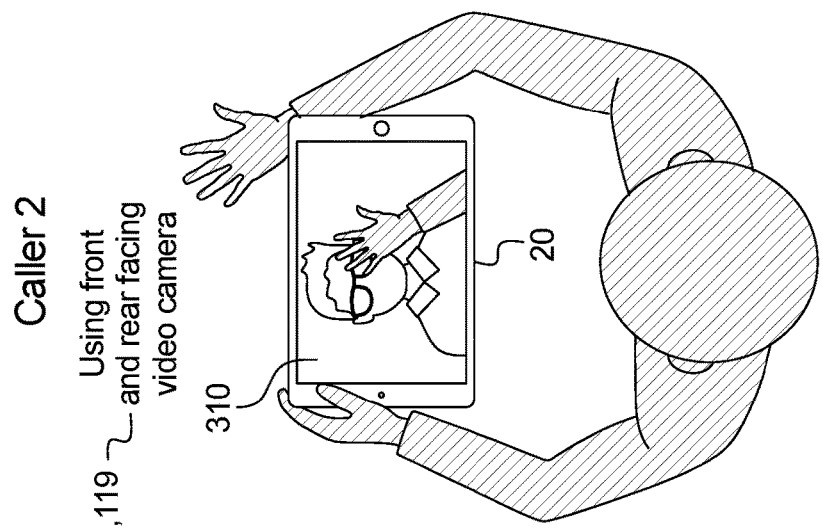
FIG. 8A is an overview diagram of a Multi-Way Touch call using the multi-feed video call system.
Figure 8A:
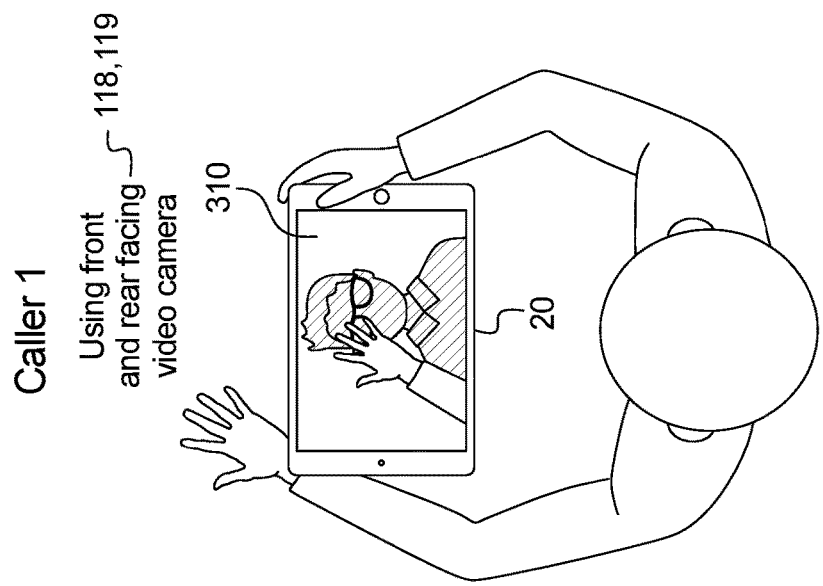

FIG. 8A is an overview diagram of a Multi-Way Touch call using the multi-feed video call system 10. As shown in FIG. 8A, a superimposed real-time video 310 of a first user's front camera 118 (Caller 1) and a second user's rear camera 119 (Caller 2) is displayed to the second user, with a superimposed real time video 310 of the video of the second user's front camera 118 (Caller 2) and the first user's rear camera 119 (Caller 1) displayed to the first user. This allows both users to "touch" the other user simultaneously with the visual effect being enabled by the superimposition of video.

Figure 8B:
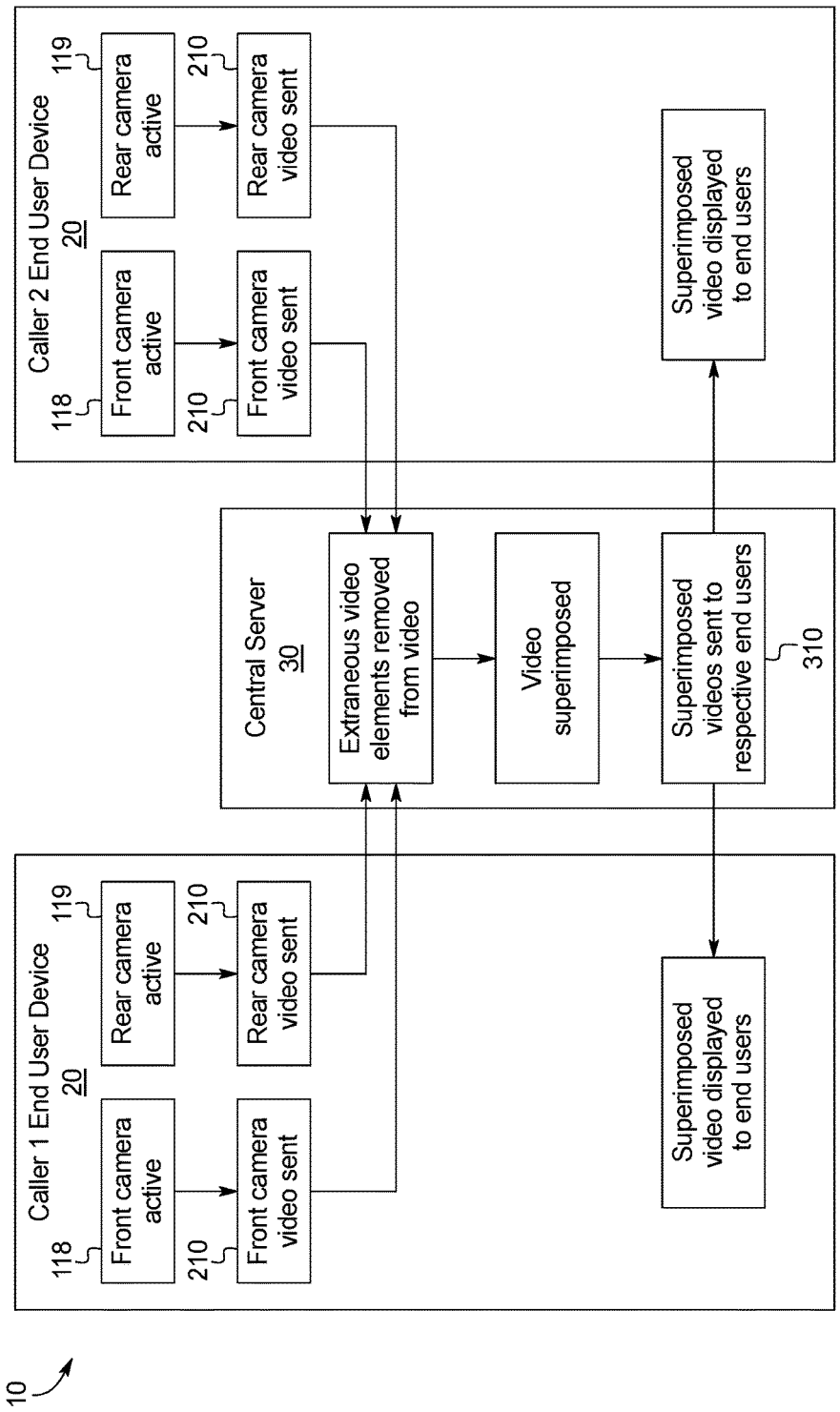
FIG. 8B is a hybrid schematic-flowchart showing how the components of the multi-feed video call system may cooperate to accomplish a Multi-Way Touch call using the process shown in FIG. 3.

FIG. 8B is a flowchart of a Multi-Way Touch call using the multi-feed video call system 10. As shown in FIG. 8B, the video 210 which will be superimposed by the system 10 originate on respective caller's end user devices 20. Both user's rear camera 119 and front camera 118 send video 210 to a centralized server 30. The video may be sent via the internet or any other functionally useful means, with the central server 30 receiving the separate video 210, analyzing them, removing extraneous information from the video 210 (e.g., solid colored backgrounds, etc.), and combining the four respective video 210 into two superimposed video 310 (as discussed in FIG. 8A). The superimposed video 310 are then sent back to the respective user device's 20 involved in the video chat via the internet or any other functionally useful means.

Aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A computer-implemented method of superimposing video carried out by a processor, the method comprising the steps of:
  receiving a first live video from a first user device, the first live video including video of a first user captured by the first user device;
  receiving a second live video from a second user device, the second live video including video of a second user captured by the second user device;
  identifying and extracting, on a continuous basis, a first human element of the first user from the first live video using a detection algorithm;
  combining the first human element of the first user and a portion or all of the second live video in real-time to create a superimposed video including a frame perimeter within which the superimposed video includes the first human element of the first user and a second human element of the second user from the second live video, wherein, within the superimposed video, the first human element of the first user and the second human element of the second user may concurrently occupy any location within the frame perimeter; and transmitting the superimposed video to at least one of the first user device and the second user device;

wherein the first live video is captured by a rear facing camera of the first user device and, in response to movement of the first human element of the first user relative to the first user device, the first human element of the first user obscures at least a portion of the second human element of the second user in the transmitted superimposed video;

further wherein the location of the extracted first human element of the first user within the superimposed video is directly controlled in real-time by the position of the first human element of the first user relative to the first user device.

2. The computer-implemented method of superimposing video of claim 1, wherein in response to real-time movement by the first human element of the first user relative to the first user device and the second human element of the second user relative to the second user device, contact is simulated between the first human element of the first user and the second human element of the second user in the superimposed video.

3. The computer-implemented method of superimposing video of claim 1, wherein the first user device is a mobile computing device.

4. The computer-implemented method of superimposing video of claim 1, wherein the first live video is captured by at least two cameras of the first user device simultaneously.

5. The computer-implemented method of superimposing video of claim 1, wherein the second live video is captured by a front facing camera of the second user device.

6. The computer-implemented method of superimposing video of claim 1, wherein the second live video is captured by a rear facing camera of the second user device.

7. The computer-implemented method of superimposing video of claim 1, wherein the detection algorithm includes one or more of foreground and background separation, proximity recognition, Chroma keying, hand-arm/body detection, background subtraction, and a Kalman filter.

8. The computer-implemented method of superimposing video of claim 1, wherein the step of identifying and extracting, on a continuous basis, a first human element of the first user from the first live video using a detection algorithm further comprises automatically selecting the detection algorithm to optimize processor utilization.

9. The computer-implemented method of superimposing video of claim 1, wherein the step of identifying and extracting, on a continuous basis, a first human element of the first user from the first live video using a detection algorithm further comprises automatically selecting the detection algorithm to optimize image quality within the superimposed video.

10. A computer-implemented system for superimposing video, comprising:
a central server featuring a processor, memory, and networking interface;
a first user device featuring a camera, processor, memory, and networking interface;
a second user device featuring a camera, processor, memory, and networking interface;
wherein one of the central server, the first user device's processor, and the second user device's processor:

receives a first live video from a first user device and a second live video from a second user device;

identifies and extracts, on a continuous basis, a first human element of a first user from the first live video using a detection algorithm;

combines the first human element of the first user with a portion or all of the second live video in real-time to create a superimposed video including a frame perimeter within which the superimposed video includes the first human element of the first user and a second human element of a second user from the second live video, wherein, within the superimposed video, the first human element of the first user and the second human element of the second user may concurrently occupy any location within the frame perimeter; and transmits the superimposed video to at least one of the first user device and the second user device;

wherein the first live video is captured by a rear facing camera of the first user device and, in response to movement of the first human element of the first user relative to the first user device, the first human element of the first user obscures at least a portion of the second human element of the second user in the transmitted superimposed video;

further wherein the location of the extracted first human element of the first user within the superimposed video is directly controlled in real-time by the position of the first human element of the first user relative to the first user device.

11. The computer-implemented system for superimposing video of claim 10, wherein in response to real-time movement by the first human element of the first user relative to the first user device and the second human element of the second user relative to the second user device, contact is simulated between the first human element and the second human element in the superimposed video.

12. The computer-implemented system for superimposing video of claim 10, wherein the first user device is a smartphone.

13. The computer-implemented system of superimposing video of claim 10, wherein the first live video is captured by at least two cameras of the first user device simultaneously.

14. The computer-implemented system for superimposing video of claim 10, wherein the second live video is captured by a front facing camera of the second user device.

15. The computer-implemented system for superimposing video of claim 10, wherein the second live video is captured by a rear facing camera of the second user device.

16. The computer-implemented system for superimposing video of claim 10, wherein the detection algorithm includes one or more of foreground and background separation, proximity recognition, Chroma keying, hand-arm/body detection, background subtraction, and a Kalman filter.

17. The computer-implemented system for superimposing video of claim 10, wherein the detection algorithm is automatically selected by one of the central server, the first user device's processor, and the second user device's processor to optimize processor utilization.

18. The computer-implemented system for superimposing video of claim 10, wherein the detection algorithm is automatically selected by one of the central server, the first user device's processor, and the second user device's processor to optimize image quality within the superimposed video.

19. The computer-implemented method of superimposing video of claim 1, the method further comprising the steps of:
identifying and extracting, on a continuous basis, a second human element of the second user from the second live video using a detection algorithm;
combining the second human element of the second user and a portion or all of the first live video in real-time to create a second superimposed video including a frame perimeter within which the second superimposed video includes the first human element of the first user and the second human element of the second user, wherein, within the second superimposed video, the first human element of the first user and the second human element of the second user may concurrently occupy any location within the frame perimeter; and transmitting the second superimposed video to at least one of the first user device and the second user device.

20. The computer-implemented system for superimposing video of claim 10, wherein one of the central server, the first user device's processor, and the second user device's processor:

identify and extract, on a continuous basis, a second human element of the second user from the second live video using a detection algorithm;

combine the second human element of the second user and a portion or all of the first live video in real-time to create a second superimposed video including a frame perimeter within which the second superimposed video includes the first human element of the first user and the second human element of the second user, wherein, within the second superimposed video, the first human element of the first user and the second human element of the second user may concurrently occupy any location within the frame perimeter; and transmit the second superimposed video to at least one of the first user device and the second user device.

\* \* \* \* \*